(12) United States Patent
Gullicksen et al.

(10) Patent No.: US 7,106,729 B1
(45) Date of Patent: Sep. 12, 2006

(54) SWITCHING CONTROL MECHANISM BASED UPON THE LOGICAL PARTITIONING OF A SWITCH ELEMENT

(75) Inventors: Jeffrey Gullicksen, Mountain View, CA (US); Daniel E. Klausmeier, Los Gatos, CA (US); Richard W. Conklin, Gainesville, GA (US)

(73) Assignee: CIENA Corporation, Linthicum, MD (US)

( * ) Notice: Subject to any disclaimer, the term of this patent is extended or adjusted under 35 U.S.C. 154(b) by 949 days.

(21) Appl. No.: 10/020,014

(22) Filed: Oct. 29, 2001

(51) Int. Cl.
*H04L 12/50* (2006.01)
*H04Q 11/00* (2006.01)

(52) U.S. Cl. .................. 370/388; 370/217; 370/220; 370/241; 370/244; 370/360; 370/380; 709/220; 709/221; 709/239; 709/244

(58) Field of Classification Search .............. None
See application file for complete search history.

(56) References Cited

U.S. PATENT DOCUMENTS

| | | | | |
|---|---|---|---|---|
| 5,917,426 A | * | 6/1999 | Yoshifuji | 370/360 |
| 6,087,958 A | * | 7/2000 | Arzt | 370/216 |
| 6,542,655 B1 | * | 4/2003 | Dragone | 385/17 |

* cited by examiner

*Primary Examiner*—Chi Pham
*Assistant Examiner*—Raj Jain
(74) *Attorney, Agent, or Firm*—Dougherty Clements; Christopher L. Bernard; Tyler S. Brown

(57) ABSTRACT

A switch element is configured to extend communications between data lines. The switch element includes a set of ingress devices, a set of center stage devices, and a set of egress devices. Each center stage device is connectable to each ingress device and to each egress device. Each ingress device connects to a corresponding egress device across one of the center stage devices. The center stage switch can be selectively actuated to accommodate a new ingress or egress device across the center stage switch.

39 Claims, 9 Drawing Sheets

SWITCHING CONTROL MECHANISM BASED UPON THE LOGICAL PARTITIONING OF A SWITCH ELEMENT

FIELD OF THE INVENTION

The present invention generally relates to a switching control mechanism for a switch element that interconnects high-speed data lines. In particular, the invention relates to utilizing logical partitioning of the switch element to perform fast rearrangements in response to switching events.

BACKGROUND OF THE INVENTION

Switches or switch elements are interconnected within a communication network in order to direct data from one point to another point within the network. Typically, each switch element has a plurality of inputs and a corresponding plurality of outputs. Network connections can be coupled to each of the switch element inputs and outputs, so that data carried on any input line of a switch element can be switched to any output line on the same switch element. Networks, however, do not remain fixed. Rather, frequently, some network connections are added, while others are dropped. Alternatively, data previously intended for one switch output line may be required to be shifted to another output line. In response to such changes, a switch element in a network must be appropriately reconfigured or rearranged.

Switching events may occur, which would require the network connections across the switch element to be manipulated. Due to the number of connections across a single switching element, compensating for a switching event can be a complex and computationally intensive procedure. Examples of switching events include instances when network connections are added to a switch element already in use or instances when one of the links between network elements fails and another route through the network element is needed.

When switching events require new connections to be formed, conventional switch elements must reconfigure the entire switch element. Many switch elements comprise devices, which are grouped into one of three stages of a three stage Clos array (e.g., within an ingress stage, a center stage or an egress stage). Typically, in response to switching events all of the switching devices (including those related to connections that are not directly affected by the switching event) within each of the stages of the array need to be reconfigured to form new connections through the switch element.

A conventional switch element in such a rearrangeable, non-blocking switching configuration typically requires considerable computational resources to accomplish reconfiguration of the switching devices within the switch element at the speed required by such applications as SONET. For example, if a switch element fails to compensate for switching events in less than 60 ms, the occurrence of the switching event may become noticeable to an end-user, which in many instances is viewed as an unacceptable result. Due to the complexities of the algorithms used to establish such reconfigurations for switch elements, it can become even more difficult to repeatedly execute control algorithms in a manner that ensures switching events are compensated for while being transparent to the end-user.

Accordingly, there is a need for a new switching control mechanism in a three stage rearrangeable, non-blocking Clos network, which provides for faster rearrangement performance in response to switching events.

SUMMARY OF THE INVENTION

In accordance with an embodiment of the invention, there is provided a switching control mechanism which enables a switch element to carry out faster rearrangements in response to switching events.

In one embodiment, the switching control mechanism is implemented in a switch element that takes the form of a 3-stage, rearrangeable, non-blocking Clos network. An embodiment of the invention is based, at least partially, upon the observation that if the connections with the Clos network are managed properly, there is no need to reconfigure all, or a large number of the connections across the switch element in response to a switching event. Instead, only the connections that are affected by the switching event are rearranged, and all other connections remain unchanged. Thus, there is no need to execute a slow and resource intensive control algorithm in response to a switching event. By rearranging only a very small number of connections in response to a switching event, and by not executing a control algorithm, the switching control mechanism makes it possible to respond to switching events more quickly.

In addition, to accelerate response to the switching events, the switching control mechanism further provides the switch element with the ability to provide operations of selecting, bridging, and arbitrary line level multi-casting functionality where new connections are formed between ingress switching devices and egress switching devices, without affecting the other connections formed across the switching element.

BRIEF DESCRIPTION OF THE DRAWINGS

The following drawings illustrate by way of example, and not by way of limitation, embodiment of the present invention in which like reference numerals refer to similar elements and in which.

DETAILED DESCRIPTION OF THE INVENTION

Figure 1A:
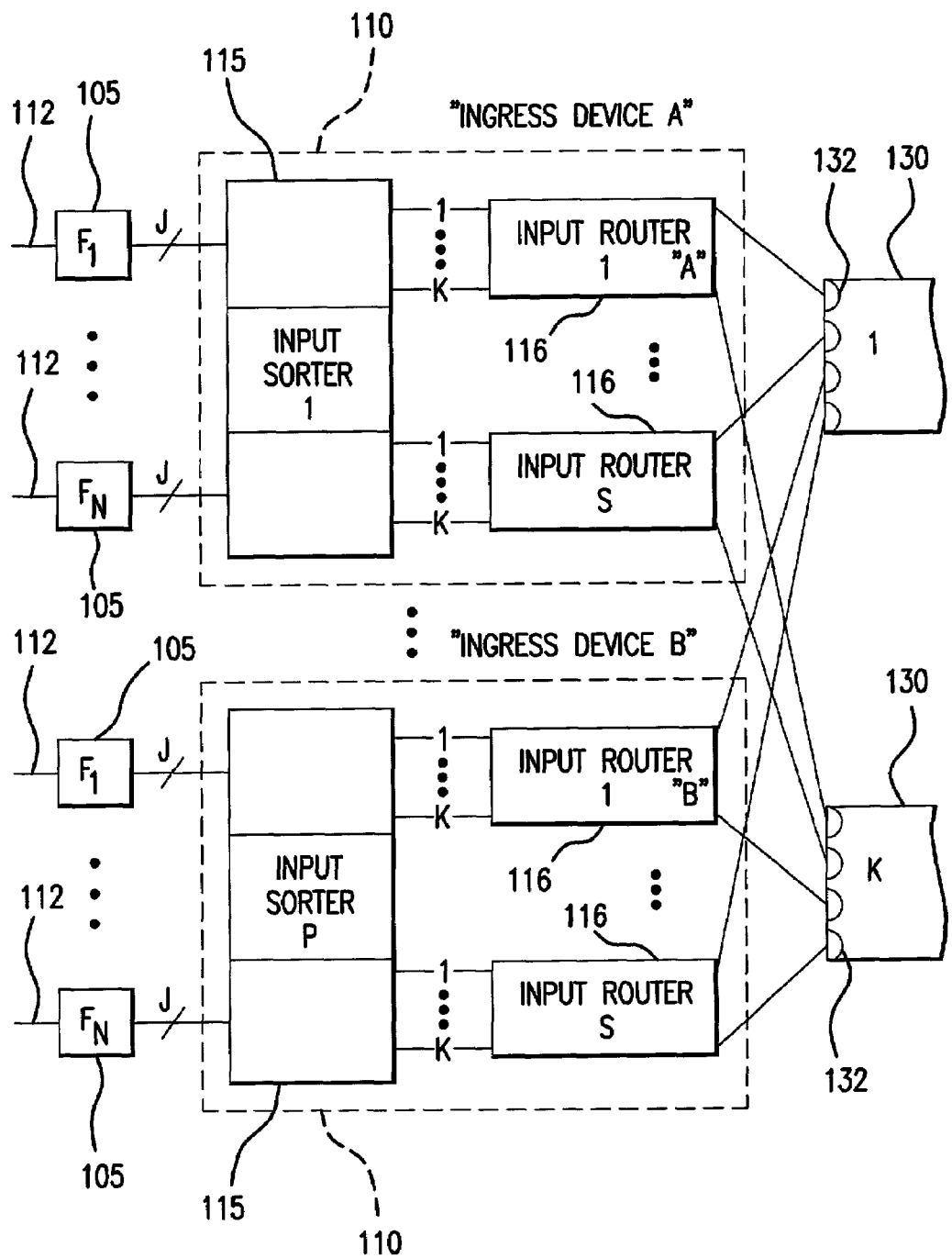
FIG. 1A is a block diagram illustrating a configuration of an ingress portion of a switch element, partitioned into a logical model, under an embodiment of the invention.

In the following description, for the purposes of explanation, numerous specific details of an embodiment of the present invention are set forth in order to provide a thorough understanding of the present invention. It will be apparent, however, that the present invention may be practiced without some of these specific details.

A. Terminology

A switch element connects one set of data lines to another set of data lines. As described herein, the switch element may comprise ingress devices, center stage devices, and egress devices. Embodiments of the invention provide that the devices of the switch element form a Clos network.

An ingress device is a component of the switch element that can be configured to switch incoming communications from one or more data lines to one or more selected center stage devices, or to one or more selected center stage device ports.

An egress device is a component of the switch element that can be configured to switch communications from one or more center stage devices to one or more data lines that connect to the switch element.

A center stage device is a component of the switch element that interconnects the ingress devices with the egress devices. One or more center stage devices may physically reside on a switch module.

Both ingress and egress devices may physically reside on a line module that is connected to a switch module. In one embodiment, a line module comprises one ingress device and one egress device.

A router is a functional aspect of an ingress or egress device that connects that ingress/egress device to a selected center stage device or center stage device's port.

A sorter is a functional aspect of an ingress or egress device that connects a data line coupled to an ingress or egress device to a plurality of routers of that ingress or egress device.

In an embodiment, ingress, egress, and center stage devices are switches. These devices may be formed by a combination of circuitry, memory, and multiplexers. Functional aspects of these devices, such as routers and sorters, may be implemented using internal components of the devices.

An edge connection is a link between an ingress device and a center stage device, or between the center stage device and an egress device.

A connection refers to interconnected components of a switch element that combine to enable one data line connected to one side of the switch element to communicate to another data line on another side of the switch element. Each connection may use an ingress device, a center stage device, and an egress device.

A switching event is an event that causes one or more of the devices in a switching element to be reconfigured. Examples of switching events include a line failure, component failure or failure of an edge. The switching event may occur on the ingress side, egress side or both.

B. Overview

In the following discussion, for illustrative purposes, embodiments of the invention will be described in the context of a 3-stage Clos network. It should be noted, however, that if so desired, the concepts taught herein may be applied to other switching configurations. Such applications are within the scope of this invention.

1. Physical Clos Network

Figure 6:
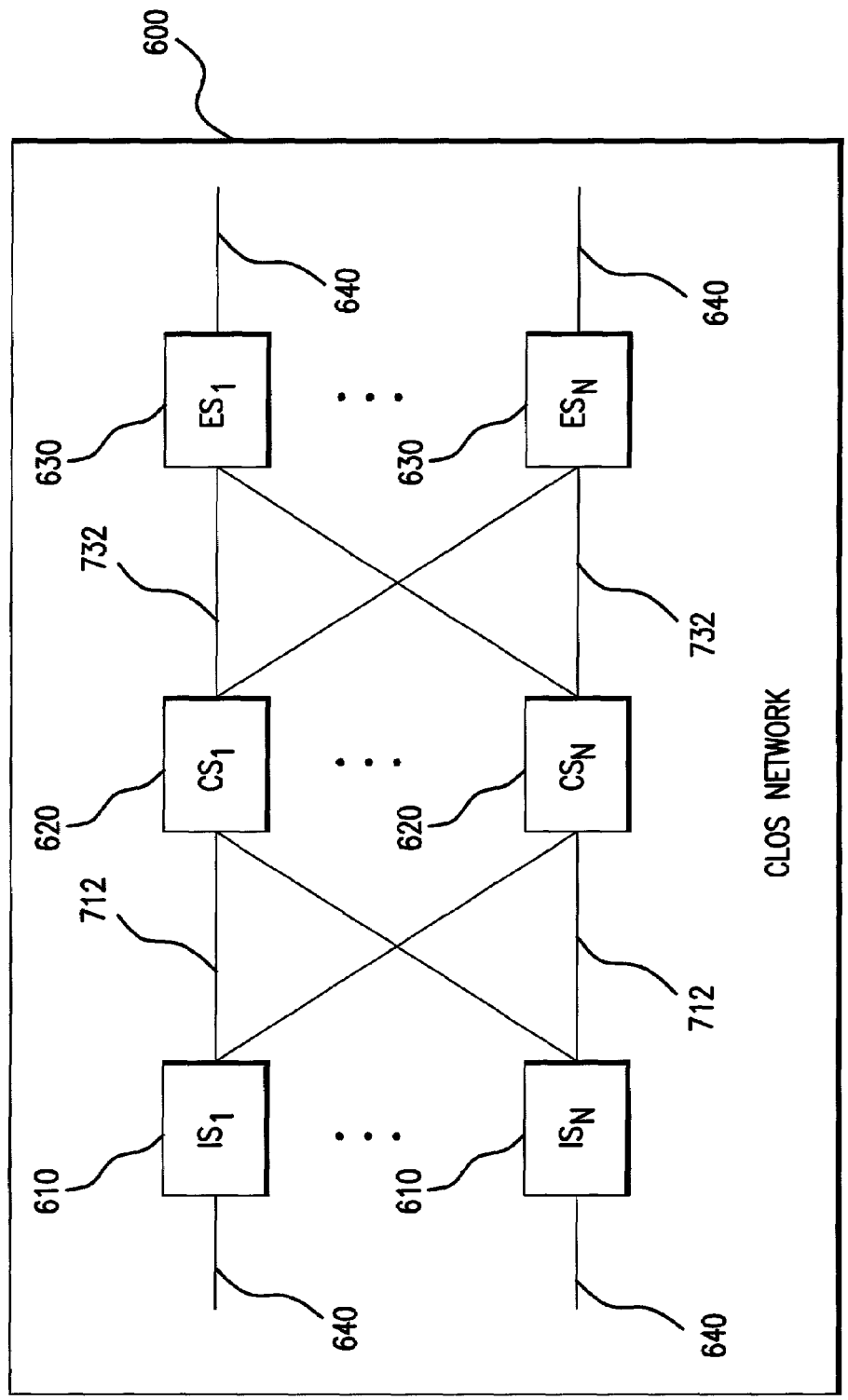
FIG. 6 is a prior-art block diagram illustrating a Clos network that can have applications for switching control mechanisms.

FIG. 6 is a block diagram illustrating a Clos network 600 that can have applications for switching control mechanisms. The Clos network 600 includes a plurality of ingress stage switches 610, a plurality of center stage switches 620, and a plurality of egress stage switches 630. A first set of edges 712 connects the ingress stage switches 610 to the center stage switches 620. A second set of edges 732 connects the center stage switches 620 to the egress stage switches 630. Each edge 712 in the first set carries a certain amount of bandwidth, represented by E1. Likewise, each edge 732 in the second set carries bandwidth, represented by E2. While edges 712, 732 in each set are assumed to carry the same amount of bandwidth as other edges in the same set, sometimes edges in the same set can carry different amounts of bandwidth.

Switch elements for high-speed data lines are structured into Clos networks in order to connect high-speed data lines 640 to one another. For example, a first set of data lines 640 may be connected to a second set of data lines 640 across a Clos type switch element. The switch element 600 can be configured to connect the data lines 640, and to reconnect the data lines in case of switching events.

Embodiments of the invention may be implemented using the 3-stage Clos network configuration. According to one implementation, the ingress stage switches 610 are each symmetrically connected to all center stage switches 620. Similarly, the egress stage switches 630 are each symmetrically connected to all of the center stage switches 620. The symmetrical connections between ingress and egress stage switches to the center stage switches may be accomplished by configuring the switch element so that the amount of bandwidth carried by the ingress stage switches and egress stage switches are the same. Furthermore, the size of the ingress stage switches and egress stage switches are the same, for any symmetrical pair. While relationships for creating symmetry across a Clos type switch element are described herein, it is possible for one skilled in the art to apply the teachings disclosed herein to asymmetrical switch elements.

As previously discussed, conventional switch elements typically use control algorithms, such as Paul's algorithm and the Looping algorithm, to establish initial configurations for the switch element. Conventional switch elements also use these control algorithms to reconfigure the switch element after a switching event is detected. Such algorithms are computationally intensive and can be intermittently unpredictable in temporal length to compute. As such, use of these algorithms for purpose of performing rearrangements of switches with existing connections can result in unacceptable delays.

In one embodiment of the present invention, a switch element can be reconfigured to modify connections amongst select network connections without affecting other connections across the switch element. In this manner, connections across the switch element can be added or changed without the need to utilize such a control algorithm to reconfigure the entire switch element. By avoiding the use of a control algorithm, embodiments of the invention can be selective in reconfiguring only portions of the switch element to compensate for failed or added connections, thereby responding to a switching event in a much shorter time interval. Furthermore, by avoiding the use of a control algorithm, intermittent slow rearrangements are avoided even after repeated rearrangements of the switch element.

2. Logical Modeling/Partitioning

Figure 1B:
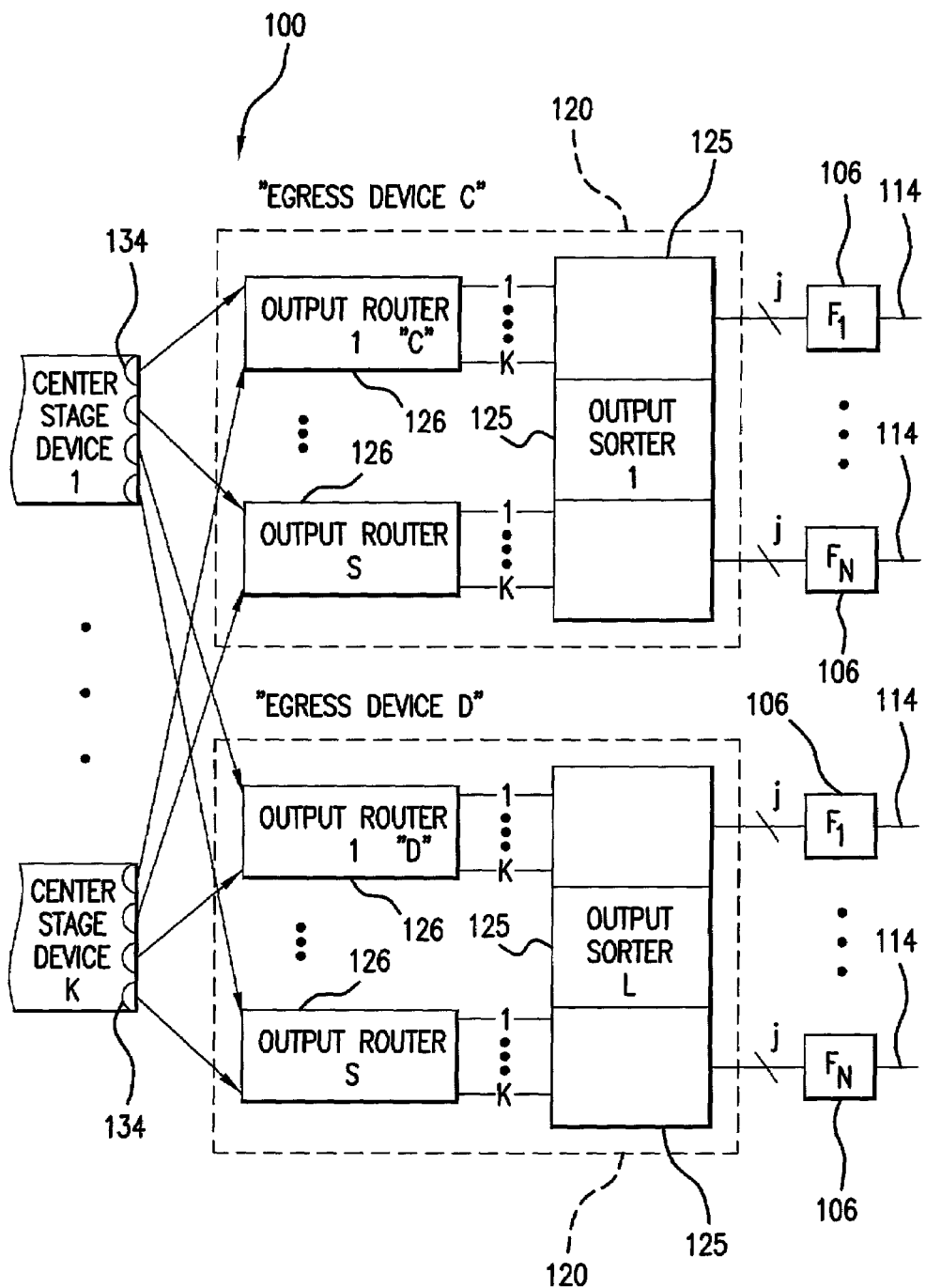
FIG. 1B is a block diagram illustrating a configuration of an egress portion of a switch element, partitioned into a logical model, under an embodiment of the invention.

In one embodiment, use of a control algorithm is avoided by properly modeling the various devices in a switch element. An example of such a model is illustrated in FIG. 1A and FIG. 1B. Such a model enables selective rearrangement of connections across the switch element to be achieved in an efficient manner. As shown in FIGS. 1A and 1B, a physical three stage Clos network switch element 600 (such as that shown in FIG. 6) can be modeled as a five stage logical switch element 100. In the logical model 100, the middle three stages form a Clos network. The first and last stages, the sorters 115, 125, allow switching across a subset of the routers 116, 126. The routers 116, 126 are the ingress and egress stages of the logical 3-stage Clos network.

Set forth below is the relationship between the physical switch element 600 and the logical model 100 of the switch element.

A model for a physical ingress switch 610 is formed by decomposing the physical ingress switch into a logical ingress device 110 comprising multiple routers 116 interconnected to one or more sorters 115, as shown in FIG. 1A. Likewise, a model for a physical egress switch 630 is formed by decomposing the physical egress switch into a logical egress device 120 comprising multiple routers 126 interconnected to one or more sorters 125, as shown in FIG. 1B. In one embodiment, a sorter 115, 125 is responsible for selecting a time slot, and a router 116, 126 is responsible for selecting a center stage device 130 to which the time slot is to be switched or from which the time slot is to be received.

A physical center stage switch 620 is modeled as a logical center stage device 130 by expanding the number of edges and reducing the number of time slots per edge. For example, if a physical center stage switch 620 has 32 physical edges and 16 time slots per edge, then the logical center stage device 130 would have 32×16 or 512 edges with one time slot per edge. Thus, the logical center stage device 130 is able to accommodate the same aggregate bandwidth as the physical center stage switch 620, but just uses a flattened index.

In one embodiment each router 116, 126 is connected to an edge of each logical center stage device 130. This means that the size of each router 116, 126 is equal to the number of logical center stage devices 130. Thus, if there are K center stage devices 130, then each router 116, 126 has a size of K (i.e., can send or receive K time slots at a time).

Assuming the symmetrical relationship where the aggregate bandwidth on the ingress side is assumed to be equal to the aggregate bandwidth on the egress side the following equation may be used to illustrate that a center stage device 130 can switch the same aggregate bandwidth as a physical center stage switch 620:

$$NLC = E * NEPC$$

where:

NLC=Number Inputs Logical Center Stage=Number Outputs Logical Center Stage,

NEPC=Number of edges in physical Center Stage Switch, and

E=the bandwidth on each edge of a physical center stage switch, assuming the ingress and egress bandwidths are the same.

A model such as that described above is an isomorphism of the physical switch element 600. Descriptions provided in this application may incorporate aspects of this model, but other models may also be implemented and contemplated under embodiments of the invention, using similar principles disclosed herein.

This model enables many benefits to be realized. As will be described in greater detail below, the model enables faster response to switching events to be achieved. In addition, it realizes this benefit without needing over-provisioned bandwidth. Over provisioned bandwidth is the bandwidth over and above necessary bandwidth to support point to point connections.

C. Switch Configuration

This section further describes the logical model of the switch element, according to an embodiment of the invention. As stated previously, the logical model of the switch element is an isomorphism of the physical switch element.

FIGS. 1A and 1B illustrate a logical model of a switch element 100. In a model such as that shown by FIG. 1, components of switch element 100 include a set of ingress devices 110, a set of center stage devices 130, and a set of egress devices 120. As will be described, the logical model provides that the components of switch element 100 can be separated into 5-stages. The 5-stages include input sorters 115, ingress routers 116, center stage devices 130, egress routers 126, and output sorters 125. This logical model can be mapped back to a physical switch element (such as the Clos network shown in FIG. 6) to implement a switch element capable of performing fast rearrangements. Software or other logic can be used to implement the logical model on the components of a physical switch element.

In the logical model shown in FIG. 1, at least one input sorter 115 and ingress router 116 are part of ingress device 110. At least one output sorter 125 and egress router 126 are part of egress device 120. A plurality of ingress data lines 112 couple to input sorters 115 of ingress devices 110. A plurality of egress data lines 114 couple to output sorters 125 of egress devices 120. Input framers 105 frame communications from ingress data lines 112 to input sorters 115. The communications framed by framers 105 provide the bandwidth (i.e. time slots) to ingress device 110. Output framers 106 frame communications from output sorters 125 to egress data lines 114. The communications framed by framers 106 provide the bandwidth to egress data lines 114.

In one embodiment, each ingress router 116 receives data from only one ingress data line 112. Likewise, each egress router 126 forwards data to only one egress data line 114. One or more ingress routers 116 may receive data from the same ingress line 112, and one or more egress routers 126 may forward data to the same egress line 114, but each ingress or egress router may receive or forward data to only a single data line 112, 114. This restriction gives rise, at least partially, to the ability to respond to switching events more quickly.

In order to assign routers 116, 126 to each data line, corresponding input and output sorters 115, 125 are partitioned. When partitioned, any unit of bandwidth from an ingress or egress line 112, 114 may be connected through the corresponding input or output sorter 115, 125 to only those routers 116, 126 assigned to that line.

On the ingress side, the number of bandwidth units that each ingress data line 112 carries is received by one of the input sorters 115. The input sorter 115 selects one or more routers 116 for each ingress data line 112 (each data line 112 has one or more routers dedicated thereto). The bandwidth units are distributed to the selected ingress routers 116. Each selected ingress router 116 then selects a center stage device 130 for each bandwidth unit received from one of the ingress data lines 112. As such, the size of each ingress router 116 (i.e. the amount of bandwidth that can pass through it at one time) is equal to the number K of center stage devices 130. Thus, each router can output K units of bandwidth, one to each center stage device 130.

On the egress side, the size of each egress router 126 is equal to the number of center stage devices 130 in use. Each egress router 126 is assigned only one egress data line 114. In addition, egress router 126 may receive a unit of bandwidth from each one of the center stage devices 130. Each egress router 126 receives from the center stage devices 130 a total amount of bandwidth that is equal to the number K of center stage devices 130. More than one egress router 126 may supply bandwidth to a particular egress data line 114, but each egress router 126 is assigned to only one egress data line 114. As with the ingress side, the output sorter 125 selects one or more routers 126 for each egress data line 114.

To illustrate how a sorter may partition time slots to routers, suppose that a data line 112 carries 48 time slots so that J, the number of time slots from a framer 105 to a sorter 115 is 48. Suppose further that the size of each router 116 is 24 so that each router is capable of handling 24 of the 48 time slots supplied by the data line 112. In such a case, the sorter 115 partitions the 48 time slots to two selected routers 116, each of which will handle 24 of the 48 timeslots. Once the time slots are partitioned in this way, the two selected routers will be dedicated to that particular data line 112.

In the logical model shown by FIG. 1, each center stage device 130 includes a set of ingress edges 132, and a set of egress edges 134. The center stage device 130 is modeled so that each ingress edge 132 and each egress edge 134 is assumed to process one unit of bandwidth. Each ingress edge 132 receives a unit of bandwidth from one of the ingress routers 116. Similarly, each egress edge 134 signals out a unit of bandwidth to one of the egress routers 120.

It is possible for more devices to exist than necessary for the logic model of switch element 100 to be implemented. For example, there may be more center stage devices than actually used. These devices may be ignored in the implementation or modeling of the switch element 100.

According to one embodiment, switch element 100 is symmetrically constructed to enable center stage switching for performing fast rearrangements. In particular, the size of each router 116, 126 is the same as the number of logical center stage switching devices 130 (K) in use. Furthermore, the size of the routers 116, 126 (M) corresponds to the number of bandwidth units that can be handled by the router. Therefore, the relationship between the size of the routers 116, 126 and the number of logical center stage switching devices 130, may be expressed as $$M=K$$

where M equals the size of each router 116, 126 in any one of either the ingress or egress devices 110, 120; and where K equals the number of center stage switching devices 130.

Another symmetry that can be incorporated into switch element 100 is the number (S) of routers 116, 126 in each ingress device 110 and egress device 120 that may be related to the number (N) of data lines 112, 114 associated with the respective ingress or egress devices 110, 120. To ensure that there is enough bandwidth to support all of the lines 112, 114, this relationship can be expressed as:

$$M*S \geq N*J,$$

where M represents the size of each router 116, 126, N is the number of data lines 112 connected to one ingress or egress device 110, 120, and J represents the number of time slots per line.

To ensure that there are enough routers 116, 126 to assign to corresponding edges of center stage devices 130 without having to share between links, the following configuration formula is used in the switch element:

$$S \geq N*\lceil J/K \rceil,$$

where S represents the number of routers, N represents the number of lines connected to each ingress stage and egress stage switching device 110, 120, J is the number of time slots per line, and K is the size of each router 116, 126. The notation $\lceil J/K \rceil$ is read as the smallest integer larger than $[J/K]$.

Given the equations above, a sample arrangement may be as follows. There may be 8 data lines 112 going into each ingress device 110, each data line providing 48 time slots. To handle all of this bandwidth, an ingress device may have 16 routers each router being 24 in size. Since a router is 24 in size, this means that there are 24 center stage devices. The same numbers may be used on the egress side.

D. Operation

Figure 2:
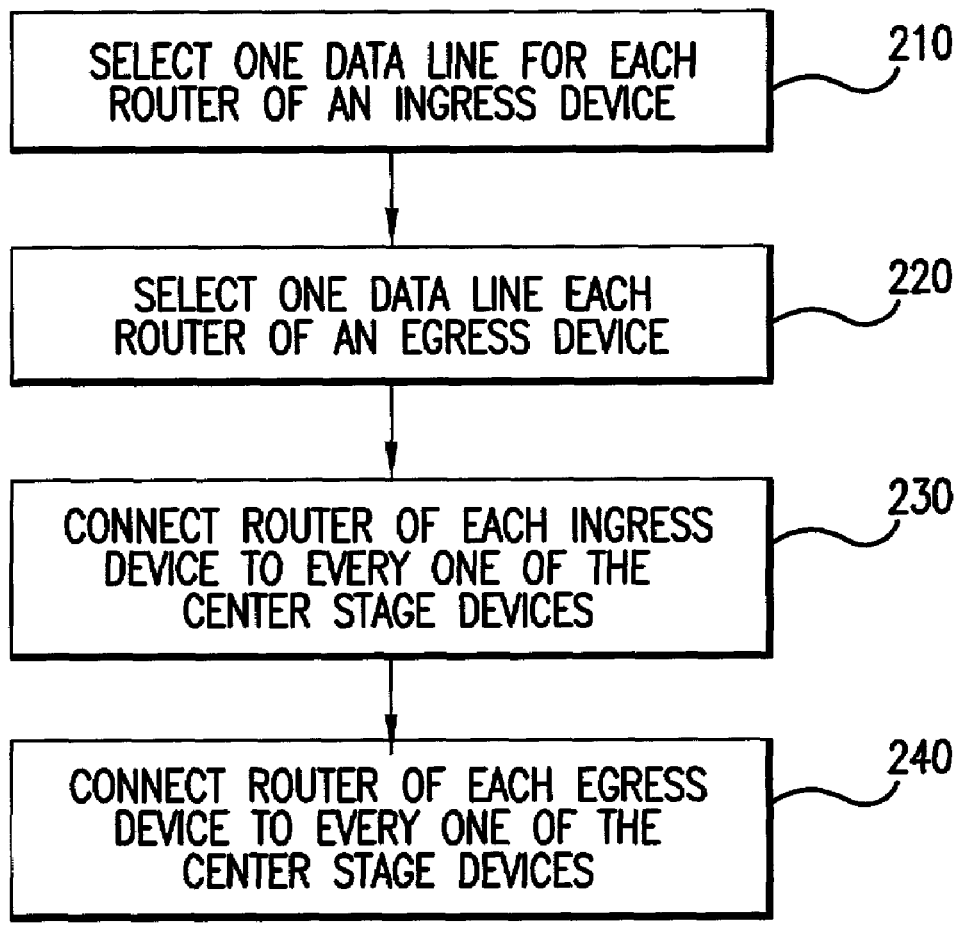
FIG. 2 is a method for structuring a switch element to perform fast rearrangements, under an embodiment of the invention.
Figure 3:
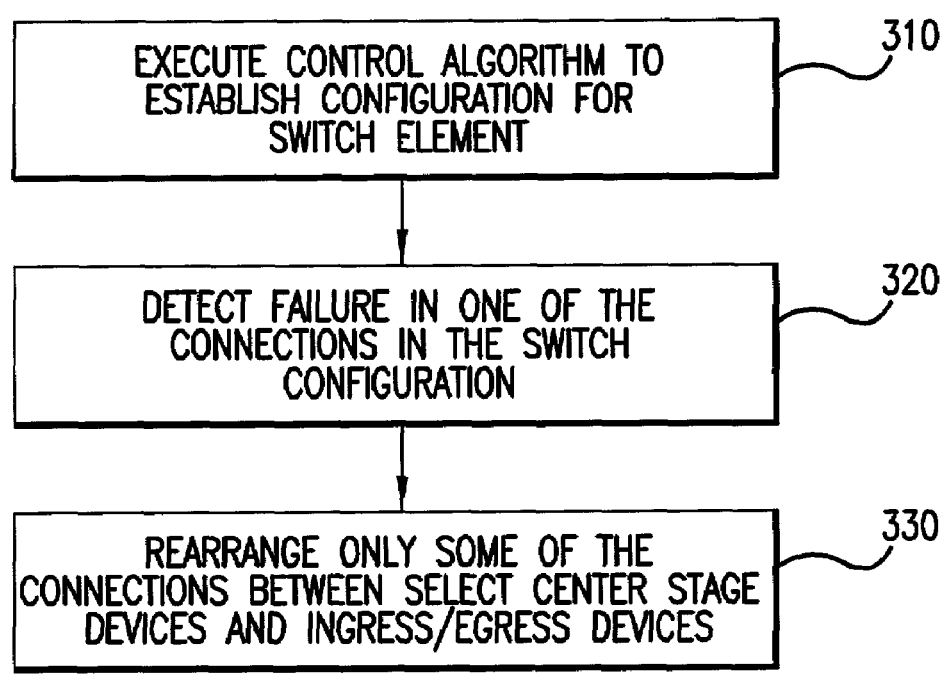
FIG. 3 is a method for performing a fast rearrangement on a switch element having existing connections, under an embodiment of the invention.

FIG. 2 shows a method of an embodiment of the present invention for modeling a switch element 100 to prepare it to perform fast rearrangements. FIG. 3 shows a method for performing a fast rearrangement on a modeled switch element 100 in response to a switching event. References to numerals of FIGS. 1A and 1B are intended to show exemplary components for implementing the methods.

With reference to FIG. 2, steps 210–240 describe the construction of the logical model of the switch element 100. In step 210, each router 116 of each ingress device 110 is assigned to a data line 112. More than one router 116 may be assigned to each data line 112, but each router 116 may be assigned to no more than one data line 112.

In step 220, each router 126 of each egress device 120 is assigned to a data line 114. More than one router 126 may be assigned to each data line 114, but each router 126 may be assigned to no more than one data line 114.

In step 230, each router 116 is connected to an edge of each center stage device 130. Since the size of each router 116 is equal to the number of center stage devices 130, each router 116 will have one connection to each center stage device 130.

In step 240, each router 126 is connected to an edge of each center stage device 130. Since the size of each router 126 is equal to the number of center stage devices 130, each router 126 will have one connection to each center stage device 130. As a result of steps 210–240, the logical model is established and ready to use.

In FIG. 3, a method is illustrated for performing a fast rearrangement on a modeled switch element 100, under an embodiment of the invention. In step 310, a control algorithm is executed to establish an initial configuration for the ingress and egress devices of the switch element 100. The configured switch element 100 establishes a plurality of connections that connect ingress data lines 112 with egress data lines 114. The routers 116 of ingress devices 110 selectively connect to ingress edges 132 of the center stage devices 130. The routers 126 of the egress device 120 selectively connect to egress edges 134 of the center stage device 130.

In step 320, a switching event is detected that affects at least one of the connections across the switch element 100. The switching event may be detected by components of switch element 100. For example, framers 105, 106 may be used to detect line failures.

In step 330, a fast rearrangement is performed that rearranges only part of the existing connections across the switch element 100. For example, only one, or a select few, of the center stage devices 130 used to connect ingress lines 112 to egress lines 114 may be affected in the rearrangement. Alternatively, only some of the connections across one or more of the center stage devices 130 may be affected. The connections that are rearranged are only those affected by the switching event.

According to an embodiment, fast rearrangements are accomplished by making new connections using one of three primitive operations. The three primitive operations may be performed from affected center stage devices 130. The three primitive operations are select, bridge and egress-select. According to embodiments of the invention, these primitive operations can be performed independently of one another, from the center stage devices of switch element 100.

In an embodiment, each of the three primitive operations can be implemented using router configurations. Any router may mimic the configuration of any other router, regardless of whether the router is used on ingress devices 110 or egress devices 120. A configuration is data that determines how the router's outputs are connected to the router's inputs. Since every router 116, 126 is connected to every center stage device 130, any traffic that was supported on one router may move to another identically configured router and still support that traffic.

The select primitive alters the source of a connection to one of the center stage devices 130 at the ingress side. A select is performed by copying the configuration of one ingress router 116 to another ingress router 116. Then, the center stage device 130 is reconfigured to accept the new router 116 as the input for the connections that the old router supported.

An egress-select is an operation that may be performed symmetrically on the egress side of one or more center stage devices 130.

The other primitive operation is bridging. Bridging causing two or more egress lines 114 to receive the same data. One egress router 126 on the egress side is designated as the parent. One or more other egress routers 126 are designated as children of the parent router 126. Connections via the re-arrangement algorithms are only placed on the parent router 126. This is guaranteed to work because the routers only support one line. Each child router 126 is given the configuration of the parent router 126. Each center stage device 130 has the capability to bridge (multicast). The output of each center stage device 130 destined to the parent router 126 is copied to all the child routers 126. In this manner each child router 126 outputs the same data as the parent router 126, thus effecting bridging. Selecting and bridging at the line level is accomplished by selecting and bridging using a plurality of routers.

This fast re-arrangement mechanism is in contrast to other conventional methods, where control algorithms need to be executed to perform the rearrangements. In such conventional systems, the control algorithm establishes the configuration for the switch element, which can introduce substantial delays into the switch element's operations. When a switching event occurs, the control algorithm is executed again to rearrange the switch element to compensate for the event. This inefficient conventional technique usually involves determining new paths for all network connections across all stages of switching.

An embodiment such as described in FIG. 3 however, can maintain most of the network connections across the switching element 100 even after a switching event has occurred and has been detected. This efficient fast rearrangement is achieved by avoiding the need to reconfigure all of the logical center stage switching devices 130 as well as corresponding ingress or egress devices 110, 120. Rather, this embodiment rearranges only select parts of the logical center stage devices 130 in response to the switching event. The rearrangements may provide for either selecting the center stage device 130 to receive communications from a new ingress stage switching device 110, or bridging/multi-casting communications on the logical center stage switching device 130 from one egress stage switching device 120 to one or more other egress stage switching devices 120.

A fast rearrangement as described with FIG. 3 can be achieved by using configuration information stored in a memory bank. The use of only one memory bank is possible because of the symmetry of the lines to the rotuers 116, 126. Since the routers 116, 126 are dedicated to a specific line, the routers 116, 126 can be rearranged without affecting any other line. This technique is in contrast to more conventional switch elements, which use two banks to perform conventional rearrangements based upon a control algorithm in response to switching events. Under such conventional systems, before using the configuration information to rearrange switch element 100 in response to switching events, an active bank swaps configuration information with a stand-by bank.

1. Implementations of Protect Lines and Working Lines

Embodiments of the invention may be used to implement working lines and protect lines across a switch element, such as described with FIG. 1. The working lines may be interconnected with one another in the absence of failures. When line or connection failure occurs, one or more protect lines may be used to enable data to be switched across the switching element. In these instances, embodiments of the invention rearrange switching elements to interconnect protect lines for failed working lines.

An important consideration for the use of protect lines is to make the switch from working line to protect line transparent to an end user or device. This requires the transfer from working line to protect line to be sufficiently fast so as to limit data loss. In current applications, it is desirable for the switch from the working line to the protect line to be accomplished in less than 60 ms.

One application of protect lines, under an embodiment of the invention, is Automatic Protection Switching ("APS"). In APS, network connections are associated with a working line or protect line. In 1+1 APS a switch element continuously bridges one protect line for each working line. In 1:N APS, a switch element 100 bridges at time of failure and assigns one protect line for every N working lines. In these configurations, a switching event typically is a failure of one of the working lines. These APS configurations require that the switch element 100 perform a fast rearrangement in order to switch the failed working line over to the protect line.

Figure 4:
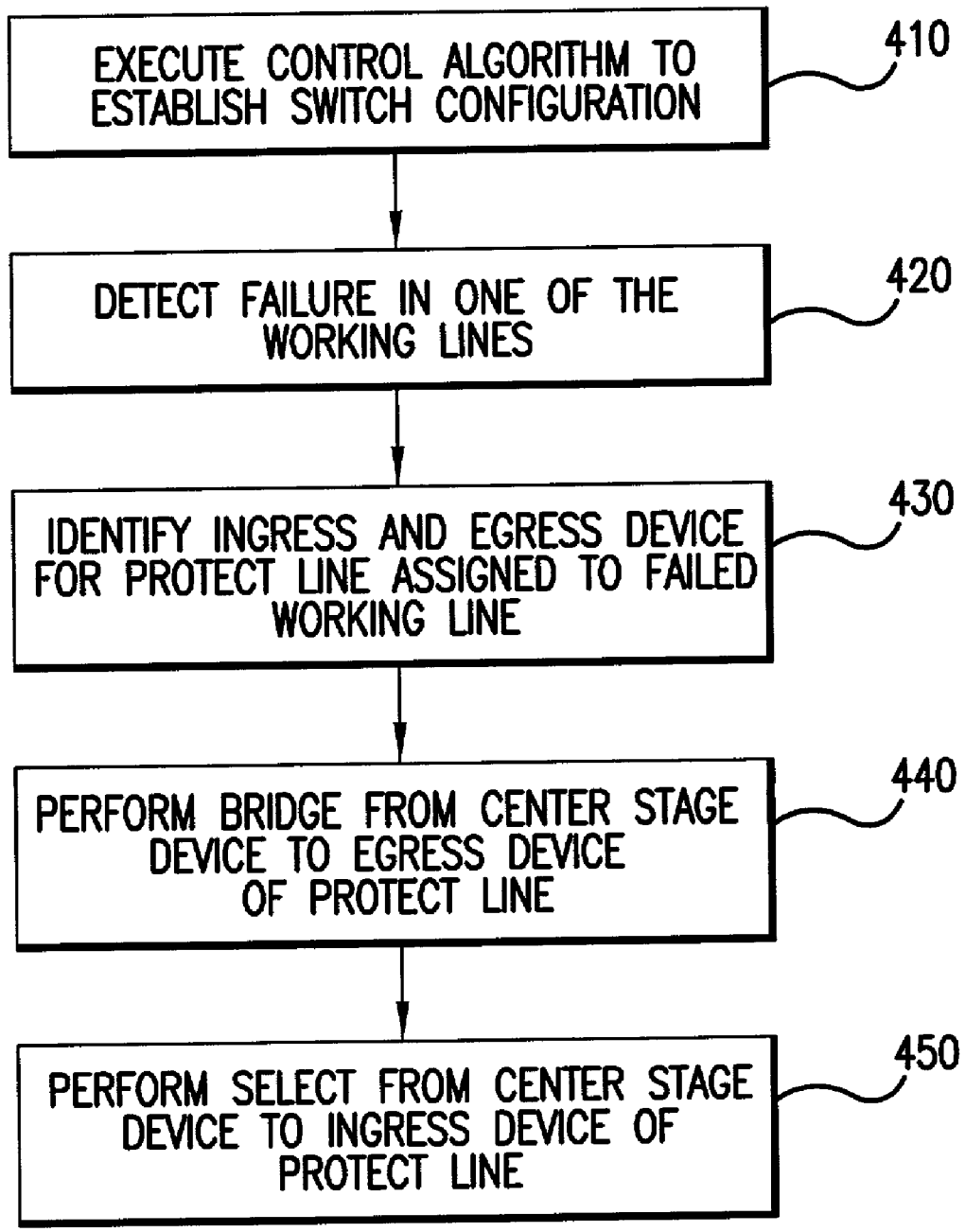
FIG. 4 illustrates a method for performing a switchover from a working line to a protect line, under an embodiment of the invention.

FIG. 4 illustrates a method for performing a switchover from a working line to a protect line using a switch element, under an embodiment of the invention. Reference to numerals in FIGS. 1A, 1B are for purpose of illustrating exemplary components to practice a method as described.

In step 410, a switch configuration is established for switch element 100. The switch configuration includes working lines and protect lines. Depending on the configuration, there may be one protect line for each working line, or one protect line for multiple working lines.

In step 420, a switching event, such as a failure, is detected in one of the working lines. For example, a line may become damaged and become unable to carry a network connection. For line failures, the switching event may be detected by one of the framers 105, 106.

In step 430, an ingress device 110 and an egress device 120 are identified that correspond to a protect line for the failed working line.

In step 440, the logical center stage device 130 bridges from the existing egress device of the connection for the failed line to the egress device 120 identified for the protect line. This step may involve clearing the identified egress device of data that it may be carrying from another network connection.

In step 450, the logical center stage 130 performs a select operation to receive communications from the ingress device 110 identified for the protect line. The select causes the existing ingress device 110 of the failed working line to be replaced with the ingress device 110 for the protect line.

In this way, the protect line is connected across switch element 100 to replace the working line.

Figure 5:
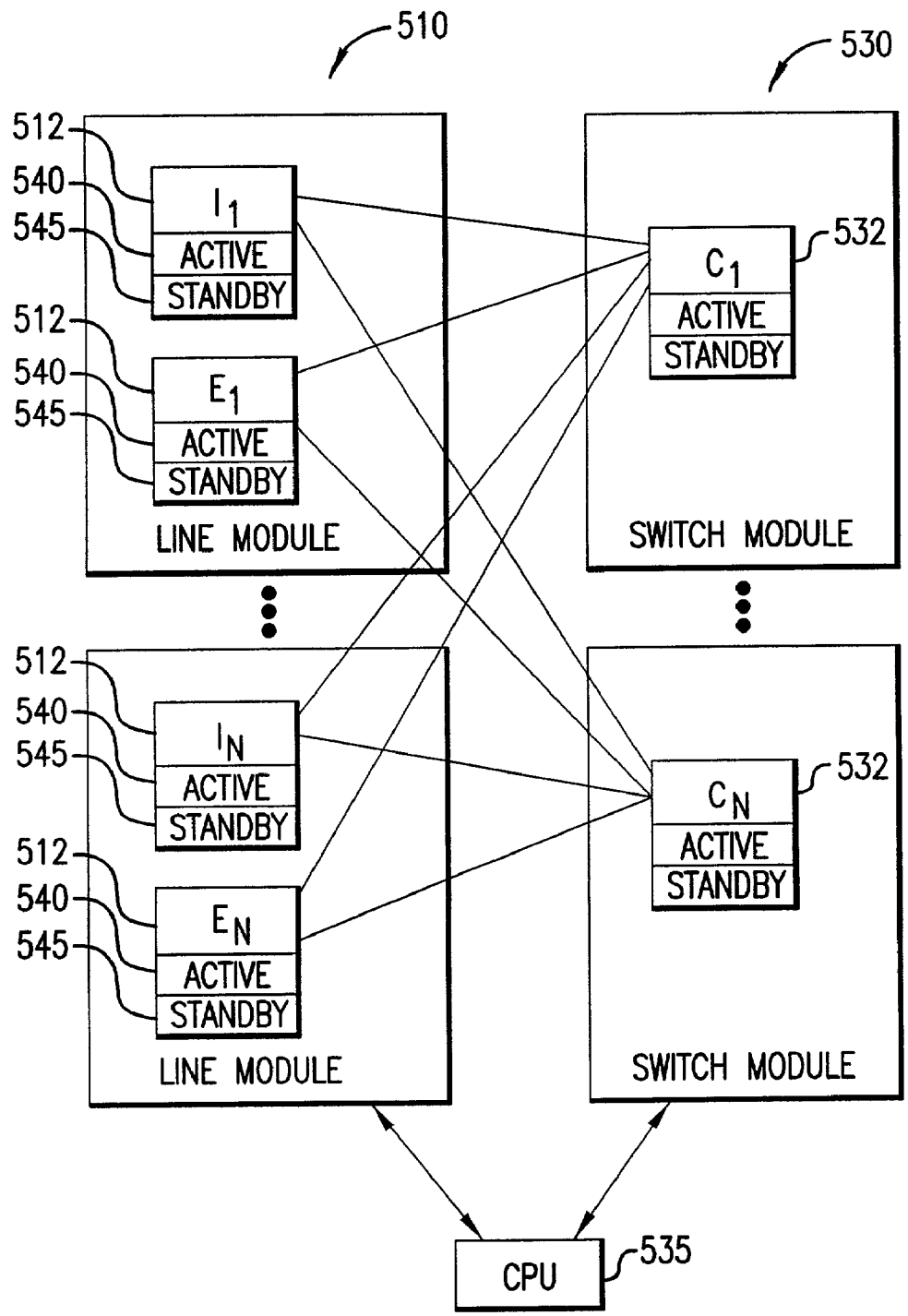
FIG. 5 is a block diagram illustrating physical components for use in an embodiment of the invention.

The following is an example of embodiment such as described with FIG. 5, with reference to FIG. 1. Router A (116) of input device A (110) is assigned to provide the working line on the ingress side. Router C (126) of egress device C (120) is assigned to provide the working line on the egress side. Router B (116) of input device B (11) is assigned to provide the protect line on the ingress side. Router D (126) of egress device D (120) is assigned to provide the protect line on the egress side.

Framers 105 or 106 may detect a failure affecting the working line. In response to this switching event, switch element 100 is to switch from the working line to the protect line. First, outgoing communications from logical center stage device 130 is bridged from Router C to Router D. This entails configuration information being copied from Router C to Router D. In addition, each center stage device 130 that has an output to Router C is reconfigured to also send that output to Router D.

Next, incoming communications to logical center stage device for Router C are selected to be received from Router B. This entails configuration information from Router A being copied over to Router B. In addition, each center stage device 130 that receives an input from Router A is reconfigured to receive input from Router B instead. In this manner, the protect line is established across switch element 100, with Router B and Router D forming the connection for the protect line.

While an embodiment described with FIG. 5 describes logical center stage device 130 as performing a bridge first, then select, other embodiments are contemplated that switch from working line to protect line using another order. For example, bridging and selecting may be performed concurrently from the center stage switch 130. It is also possible to select the new ingress device before bridging to the new egress device 120. Other methodologies for switching from working lines to protect lines are contemplated, using combinations of the primitive operations discussed in FIG. 3.

In addition, an embodiment described with FIG. 5 assumes that protect lines and working lines have separate ingress and egress devices 110, 120. This does not have to be true. A protect line and working line may be provided on the same ingress or egress device 110, 120. In this case, the affected center stage device 130 bridges to a new egress router 126 of the same egress device in step 440. In step 450, the affected center stage device selects from a new ingress router 116 in step 450.

In another variation, it is possible to replace one portion of the working line with a protect line, while maintaining the other portion of the working line intact. For example, in case of line failure to the ingress side of a working line, a new protect line may be connected to the ingress edge of the logical center stage device using a select operation. No change may be made to the egress working line.

2. Operation Summary

The discussion above describes how the logical switch element 100 may be reconfigured in response to a switching event. After the logical switch element 100 is reconfigured, the reconfiguration is mapped to a physical switch element 600 to actually implement the reconfiguration. As noted previously, this mapping may be performed by a CPU running a set of software or by specialized logic components.

The following summarizes the overall modeling and reconfiguration process:
  Derive a logical model, such as that shown in FIGS. 1A and 1B, for a physical switch element;
  Run a control algorithm to determine an initial configuration for the logical model;
  Map the initial configuration to the physical switch element to implement the configuration;
  Detect a switching event;
  Derive a new configuration for the logical model in response to the switching event; and
  Map the new configuration to the physical switch element to implement the new configuration.

Because the new configuration is determined using the logical model, and because the logical model is set up in the manner previously described, fast reconfiguration is possible, and selective reconfiguration is possible. These and other benefits can be realized with the present invention.

Thus far, the invention has been described with the assumption that the switch element 100 shown in FIGS. 1A and 1B is a logical model of a physical switch element. It should be noted, though, that if so desired, the switch element 100 could be implemented as a physical switch element. That is, the ingress device, center stage, and egress device could be physically implemented as shown, using actual sorters, routers, etc. In such an implementation, no logical to physical mapping would be needed. The switch element 100 could be implemented as is. This and other implementations are possible.

E. Hardware Components

FIG. 5 is a component diagram of a system 500 incorporating switch element 100, under an embodiment of the present invention. For example, a switch element such as described with FIGS. 1A and 1B may include components distributed on modules of the system 500. The system 500 includes a plurality of line modules 510, and a plurality of switch modules 530. Each line module 510 includes an ingress device 512 and an egress device 514. The switch modules 530 include one or more center stage devices 532. The system also includes an active bank 540, and a stand-by bank 545. The active and stand by banks may be part of the individual ingress, egress, and center devices 512, 514. One or more processing units 535 accesses information stored in the banks 540, 545 to configure the ingress, egress, and center devices in line module 510 and center stage devices in switch module 530.

According to an embodiment, a plurality of framers 505 are also provided on each line module 510. The framers 505 frame communications from optical carriers (not shown). The system may be partitioned so that each framer 505 represents one optical carrier. In an example shown, switch module 530 includes two center stage devices 532.

The processing unit 535 executes control algorithms to establish the configuration for the line modules 510 and the switch modules 530. Examples of control algorithms include Paull's algorithm, and the Looping algorithm. As discussed, these algorithms are executed to initially interconnect data lines across the switch element. The algorithms do not have to be used when a switching event occurs after the initial interconnections are made.

In an embodiment, line module 510 and switch module 530 are combinations of semi-conductor equipment. One or more of the framers 505, ingress devices 512 and egress devices 514 may each be on an individual semi-conductor chip and interconnected on line modules 510. Likewise, one or more of the center stage devices 532 may be on individual semi-conductor chips. One or more electrical connection exists between line modules 510 and switch modules 530. Each electrical connection provides an amount of bandwidth to enable exchange of electrical data of a particular size. Moreover, the data is exchanged in defined time slots. In one embodiment, the amount of bandwidth between the line module 510 and the center stage module 530 permits data for 18 time slots to be exchanged at any one time, and the amount of bandwidth into and out of each line module 510 is 384 time slots. One or more ports on each of the line modules 510 and each of the switch modules 530 may provide the bandwidth.

When mapped to the logical model, each port of line module 510 and center stage module 530 corresponds to multiple edges to ingress devices 110 (FIG. 1), egress devices 120 (FIG. 1) and center stage devices 130 (FIG. 1). When center stage device 130 is flattened, one edge may carry one time slot. But on switch module 530, one port corresponds to multiple edges, for exchanging multiple time slots with one of the line modules 510.

To establish an initial configuration for the switch element 100 (see FIGS. 1A and 1B), processing unit 535 executes one of the control algorithm to produce configuration information for configuring the switch element. The configuration is stored in the stand-by bank 545. When the switch element 100 needs to be configured, data stored in the active bank 540 is swapped with the data stored in the stand-by bank 545. The active bank 540 is subsequently accessed to configure specific configurations of the ingress devices 512, egress devices 514, and center stage devices 532, according to the configuration information provided by the control algorithm.

According to an embodiment, the control algorithm determines alternate configurations for each center stage device 532 in the switch module 530 at the time the initial switch configuration is being established. Then in response to a switching event, information already stored in the active bank 540 is used to reconfigure select center stage devices 532. The select center staged devices 532 can be bridged, multi-cast, selected, by passed or configured in some other manner to account for the switching event. One advantage provided by an embodiment of the invention is that a fast and selective rearrangement can be performed for connections to center stage devices, without need for re-executing a control algorithm, writing rearrangement data to the stand-bye bank before performing the rearrangements, or swapping the active bank 540 with the stand-bye bank 545. This is made possible by using a relatively trivial amount of configuration information to rearrange only selected devices in the switch element 100. In particular, only edge device connections to select center stage devices 532 are altered in a rearrangement.

In one implementation, there are 32 line modules and 15 switch modules. The bandwidth between line modules 510 and switch modules 530 provides for 18 ports for receiving communication frames. In this implementation, a switch element such as shown by FIG. 1 has 32 ingress devices 512, 32 egress devices 514, and 30 center stage devices 532. There are 12 ports for each line module, and 18 ports for each center stage module. The total bandwidth (or time slots available) into ingress devices 512 or egress devices 514 for the entire system 500 is 384 (12*32), while the bandwidth into all of the switch modules 530 is 540 (18*30).

The larger bandwidth of the switch module 530 illustrates some of the advantages of using center switch devices to perform rearrangements. In particular, not all of the center stage devices 532 need to be used. Rather than maximizing the number of center stage devices, a select number of center stage devices 532 may be employed to ensure symmetry between the ingress and egress edges of the system 500. The symmetry ensures that the outcome of rearrangements is predictable.

F. Pass-Through Applications

Two sets of data lines may be connected to one another using a "passthrough" type connection. In "passthrough" connections, bandwidth units provided by a first set of data lines are matched to bandwidth units in a second set of data lines. In some applications, the bandwidth units are time slots. A first set of data lines are connected to a second set of data lines so that time slots available on the first set of data lines are matched to time slots available on the second set of data lines. According to an embodiment, each time slot in the first set of data lines is matched to only one time slot in the second set of data lines to form the passthrough connection.

Embodiments of the invention contemplate use of a switch element, modeled as described with FIG. 1, for purpose of implementing passthrough type connections on a network. According to embodiments of the invention, a switch-element is modeled in a manner described with FIG. 1 and other embodiments, for purposes of being able to implement passthrough connectivity. As will be described, one application for passthrough connectivity is in a ring network.

In a ring network, a plurality of communication devices connect to one another to form a ring. The ring may have two or more communication rings, with at least one working ring and one protect ring. When both working ring and protect ring fail, passthrough connectivity may be implemented at select locations of the ring network in order to maintain communications between all of the communication devices in the ring.

Figure 7A:
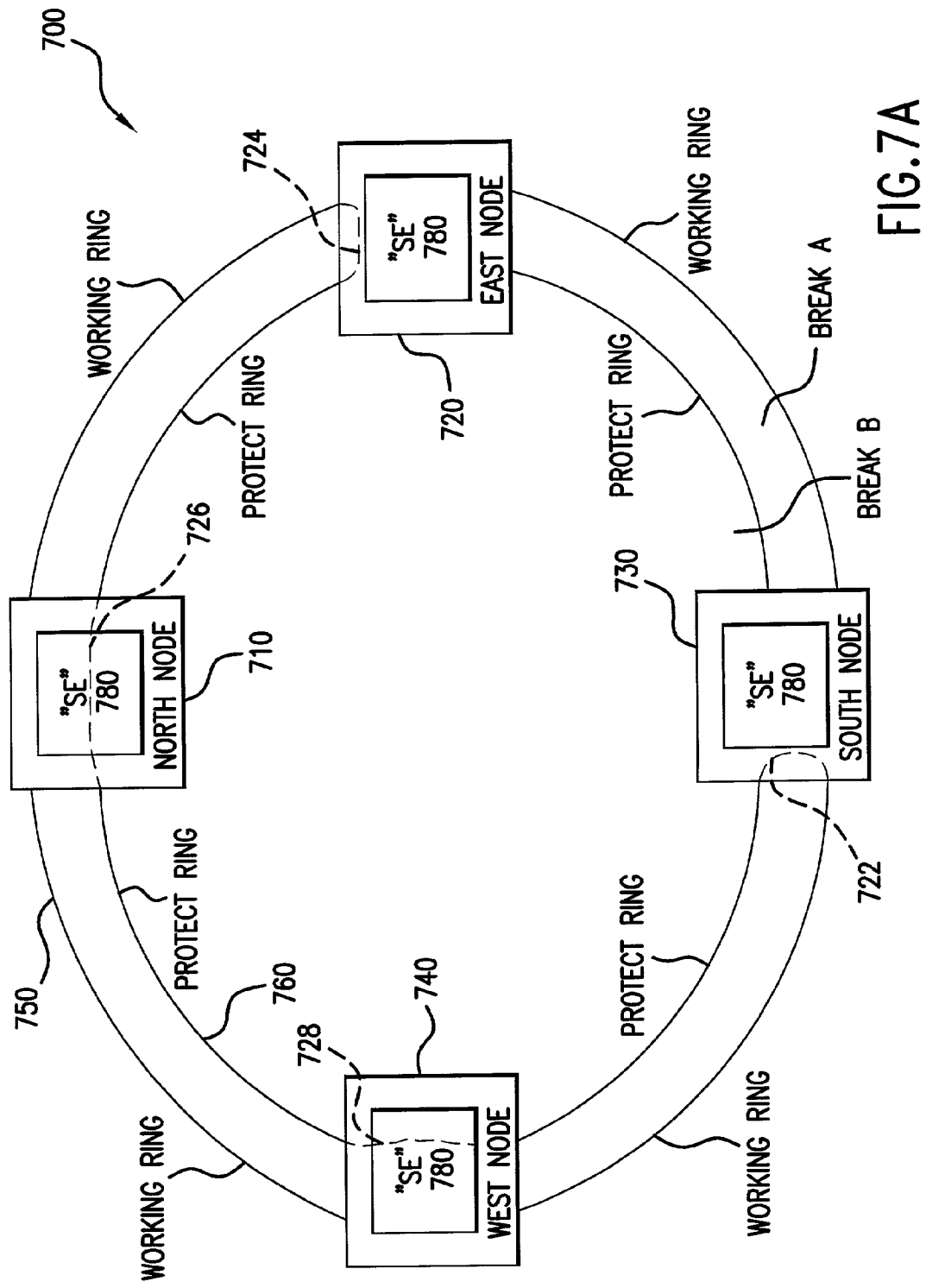
FIG. 7A is a block diagram of a ring network implementing an embodiment of the invention.

FIG. 7 illustrates a ring network 700 configured to implement passthrough connectivity, under an embodiment of the invention. The ring network 700 includes a north node 710, an east node 720, a south node 730, and a west node 740. A working ring 750 interconnects the nodes 710–740. A protect ring 760 is provided if working ring 750 fails. Each node 710–740 may correspond to a server or other device that incorporates a switch element 780 in order to interconnect high-speed data lines.

If working ring 750 fails, but protect ring 760 is operational (Break A), nodes adjacent to the failure execute a rearrangement to interconnect the lines of the working ring 750 with the lines of the protect ring 760. The rearrangement may be executed as described with FIG. 5, and other embodiments of the invention. For example, if working ring 750 fails on a link between the south node 730 and the east node 720, the south node executes a rearrangement across its switch element 780 in order to connect lines of the working ring 750 on its west side with lines of its protect ring 760 on its east side. The east node 720 executes a rearrangement across its switch element 780 in order to connect lines of the working ring 750 on its north side with lines of the protect ring 760 on its south side.

If both working ring 750 and protect ring 760 fail (Break B), then some nodes in the ring network 700 implement passthrough switching, and others implement rearrangements. Specifically, at nodes adjacent to the break, full connectivity of the ring network 700 is maintained by connecting lines of the working ring 750 with lines of the protect ring 760. At the south node 730, a first switch connection 722 can be formed by switching the working ring 750 to be connected to the protect ring 760. At the east node, a second switch connection 724 connects the working ring 750 to the protect ring 760. In an embodiment, the first and second switch connections 722, 724 may be formed by modeling switch elements in a manner described by FIG. 1. Then, a fast rearrangement may be implemented when the working and protect rings fail.

Nodes not adjoining Break B are structured to implement passthroughs between protect lines. In this implementation, north node 710 uses a first passthrough connection 726 to connect protect ring lines on its west side with protect ring lines on its east side. The west node 740 implements a second passthrough connection 728 to connect protect ring lines on its south side with protect ring lines on its north side.

In order to implement passthrough connections, ring network 700 may be configured as follows. Each line forming the protect ring 760 is the same size as other lines in the protect ring. Each line forming the working ring 750 is the same size as other lines in the working ring. In addition, the size of the protect ring lines may be the same size as the working ring lines. Furthermore, when there is failure to both the working ring 750 and the protect ring, all traffic on the protect ring 760 is either gone or destroyed.

In one embodiment, optical connections are used between nodes 710–740, so that switch elements 780 is configured for switching optical carriers. The nodes 710–740 may, for example, be core directors for optical carriers. The working ring 750 and the directors of nodes 710–740 may be configured to operate in a SONET environment. One example of a director for optical applications is MULTIWAVE CORE-DIRECTOR, manufactured by CIENA CORPORATION, the assignee of this application. The directors of nodes 710–740 may be part of, or otherwise integrated with, other systems, such as a server or server system, and other types of computer systems.

Figure 7B:
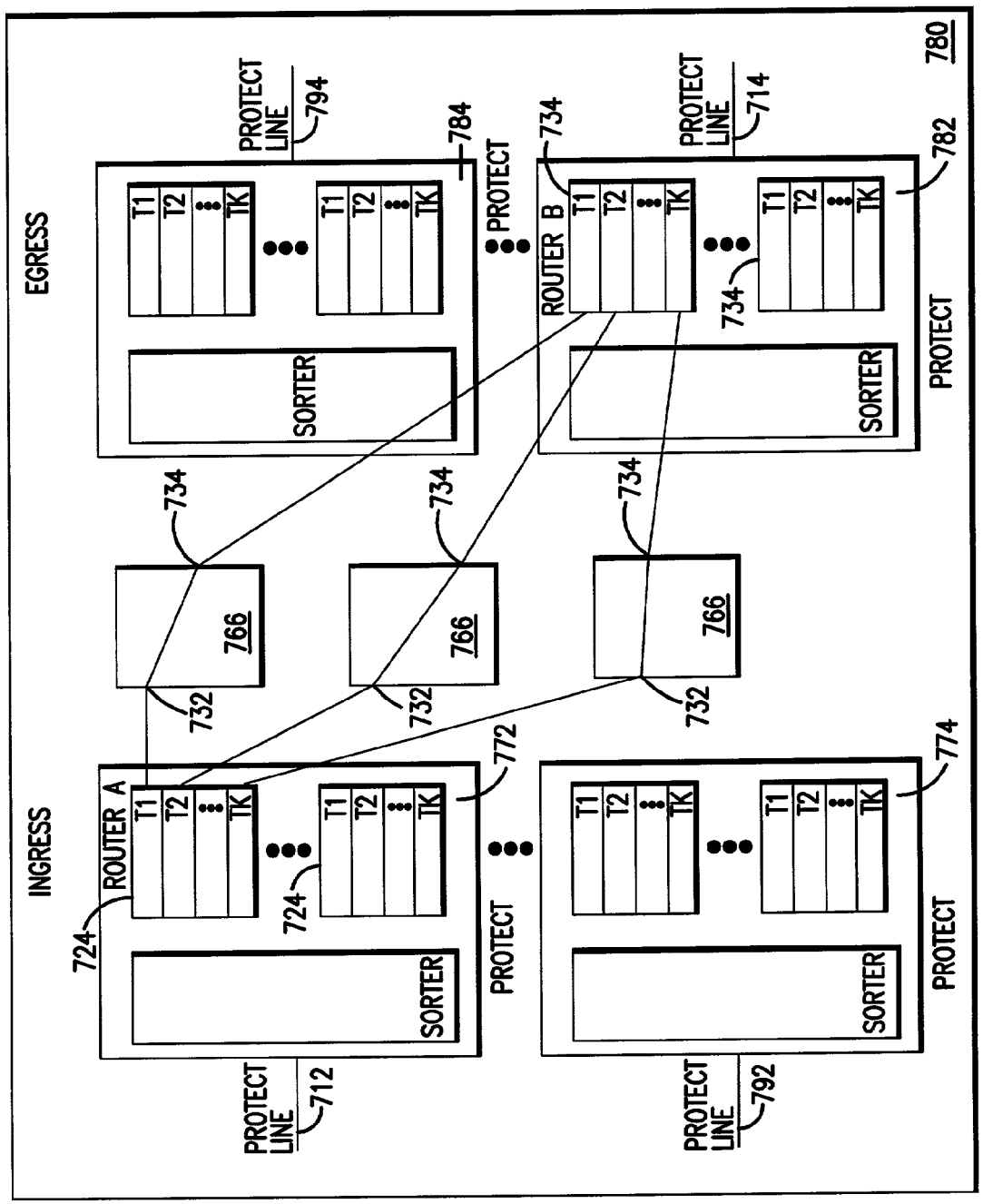
FIG. 7B illustrates a switch element modeled to implement a passtrhough connection, under an embodiment of the invention.

FIG. 7B illustrates, in greater detail, switch element 780 of one of the nodes 710–740. The switch element 780 is structured so as to be able to perform a passthrough connection between protect lines of the protect ring 760.

Switch element 780 includes protect ingress devices and working ingress devices. A protect ingress device 772 and a working ingress device 774 are shown on the ingress side of switch element 780. A protect egress device 782 and a working egress device 784 are shown on the egress side of the switch element 780. A set of center stage devices 766 interconnect the ingress devices to the egress devices. The ingress devices, egress devices, and center stage devices are configured to form a Clos network switch element.

In the pass-through, all traffic on the protect lines prior to failure is destroyed or non-existent in the switch element 780. A passthrough connection is formed between the protect ingress device 772 and the protect egress device 784. This passthrough connection displaces a possible previous connection between the protect ingress device 724 and any other egress device as well as connection between protect egress device 734 and any other ingress device. There may be multiple protect ingress devices to connect to multiple protect egress devices. The connection being protected on the passthrough node was not present on that node prior to the failure.

As described with previous embodiments, the switch element 780 can be modeled into five stages, with the intermediate three stages forming a Clos type relationship. In a logical model, protect ingress device 772 includes an input sorter 722 and a plurality of ingress routers 724. Likewise, protect egress device 782 includes a plurality of egress routers 734 and one or more output sorters 732. The logical center stage devices 766 each have ingress edges 732 and egress edges 734.

In FIG. 7B, a set of east protect lines 712 and a set of west protect lines 714 form portions of the protect ring 760. Both sets of protect lines 712 and 714 can carry bi-directional communications. The east set of protect lines 712 and west set of protect line 714 may each comprise multiple data lines. The east set of protect lines 712 is connected to the west set of protect lines 714. For the other direction the east set of protect lines 792 is connected to the west set of protect lines 794.

According to embodiments of the invention, switch element 780 may be modeled in the following manner. First, each router 724 of the protect ingress device 772 is assigned only one of the set of ingress data lines 712. Each router 734 of the protect egress device 774 is assigned only one of the set of egress data lines 714. As noted with other embodiments, the converse of these relationship is not necessarily true-one data line in the set of east or west protect lines 712, 714 may be assigned more than one of the corresponding routers 724, 734.

Second, the size of each ingress router 724 and egress router 734 is equal to the number of center stage devices 766 in use. Each router 724 of protect ingress device 772 is connected to each center stage device 776. Likewise, each router 734 of protect egress device 782 is connected to each center stage device 766.

Other relationships noted with FIG. 1 and other embodiments may also be employed to model switch element 780. In particular, symmetrical relationships may be created across the switch element 780 to facilitate making rearrangements and passthrough connections.

Since traffic on protect ring 760 (FIG. 6) is non-existent after working and protect rings 750 and 760 fail, the passthrough across north node 710 can be implemented with minimal resources. To perform the passthrough, each time slot on the protect ingress device 772 is assigned to a corresponding time slot on the protect egress device 782. This process may be repeated for each protect ingress device and egress device employed on switch element 780. Since each time slot outputted by one of the ingress protect routers 724 belongs to only one ingress data line 712, time slots mapped between protect ingress and egress routers are mapping time slots from one ingress data line 712 to one egress data line 714.

In order to make the time slot assignments between protect ingress and egress devices, individual time slots outputted from each ingress router 724 are assigned to individual ingress edges 732 and egress edges 734 on each center stage device 766. In addition, individual time slots to each egress router 734 are assigned to individual ingress edges 732 and egress edges 734 on each center stage device 766.

In this way, the passthrough connection is formed because the routers 724 of protect ingress device 772 have full connectivity with the routers 734 of protect egress device 734. Every time slot on one of the ingress routers 724 is assigned to a corresponding time slot on one of the egress routers 734, and vice-versa. Protecting the other direction, from 792 to 794, is accomplished in the same way.

Referring to FIG. 7B, for example, protect ingress device 772 is one of multiple ingress devices used by the protect ring 760. This protect ingress device 772 will replace the working ingress device 774 when Break B occurs. The protect ingress device 772 is matched to protect egress device 774 in order to make a pass-through connection. This may be done by assigning timeslot T1 of router 724 (labeled as Router A) to a corresponding timeslot T1 of router 734 (labeled as Router B). Other timeslots (T2 . . . Tk) of Router A can be connected to corresponding individual timeslots (T2 . . . Tk) of Router B. Similar connections between other protect ingress devices 772 and protect egress devices 774 can be made. The selection of protect ingress and egress devices, as well as time slots assigned between those devices, may be determined before Break B occurs.

G. Alternative Embodiment

While embodiments described above illustrate use of one ingress device that statically assigns multiple data lines, other embodiments of the invention allow for only one data line 112, 114 (FIG. 1) to be assigned to one ingress device 110 (FIG. 1) or egress device 120 (FIG. 1). For example, in FIG. 1, one ingress data line 112 may be assigned to Ingress Router A. If the size of the data line 112 is greater than the router 116, multiple routers in that ingress device may be used. But each router 116 in ingress device 110 is assigned to only one ingress data line 112. A similar arrangement may be followed on the egress side.

H. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for switching data lines, the method comprising:
    establishing a configuration for a switch element, the configuration comprising a plurality of connections between data lines in a first plurality of data lines and data lines in a second plurality of data lines, the switch element including a set of ingress devices, a set of center stage devices, and a set of egress devices, each connection including at least one of the ingress devices, one of the center stage devices and one of the egress devices, wherein multiple connections are extended across each center stage device;
    logically modeling the switch element and mapping a multi-stage logical model that represents the components of the switch element in multiple stages, comprising an input sorter, an input router, a center stage device, an output router, and an output sorter, to the switch element;
    detecting a switching event;
    selecting a portion of the plurality of connections, including one or more connections across at least one of the center stage devices; and
    rearranging only the selected connections across at least one of the center stage devices in response to the switching event using the logical model.

2. The method of claim 1, wherein rearranging only the selected connections across the at least one of the center stage devices includes replacing a first connection of the selected connections across one of the center stage devices with a new connection across that center stage device.

3. The method of claim 2, wherein replacing a first connection of the selected connections across one of the center stage devices includes using a new egress device and a new ingress device for the new connection that replaces the first connection.

4. The method of claim 1, wherein rearranging only selected connections across at least one of the center stage devices includes identifying at least one of an ingress device and an egress device for each of the selected connections, and replacing the at least one of the ingress device and the egress device with a new ingress device or egress device respectively.

5. The method of claim 4, wherein rearranging only selected connections across at least one of the center stage devices includes identifying the egress device of one of the selected connections, and bridging from the center stage device for that connection to a new egress device to form the new connection.

6. The method of claim 1, wherein rearranging only selected connections across at least one of the center stage devices includes identifying the ingress device of one of the selected connections, and performing a select from the center stage device for that connection in order to replace the ingress device with the new ingress device.

7. The method of claim 1, wherein selecting a portion of the plurality of connections includes selecting at least a first connection between a first data line in the first plurality of data lines and a second data line in the second plurality of data lines, and then rearranging portions of the one or more selected connections so that only one of the first data line or the second data line is switched to a third data line.

8. The method of claim 7, wherein the first connection includes a first ingress device in the set of ingress devices, a first center stage device in the set of center stage devices, and a first egress device in the set of egress devices, and wherein rearranging portions of the one or more selected connections includes selecting at least one of a second ingress device for connecting the second data line to a third data line, or selecting one of a second egress device for connecting the first data line to the third data line.

9. The method of claim 8, further comprising causing the first center stage device to bridge a communication from the first data line to the third data line.

10. The method of claim 8, further comprising causing the first center stage device to select a communication from the third data line to the first data line.

11. The method of claim 8, further comprising causing the first center stage device to multi-cast a communication from the first data line to a plurality of other data lines.

12. The method of claim 1, wherein each ingress device in the set of ingress devices includes a plurality of routers, the plurality of routers for at least the first ingress device connecting the first ingress device to each of the center stage devices in the set of center stage devices, and wherein establishing a configuration for the switch element includes configuring each router of at least the first ingress device to receive communications from only one of the first data lines.

13. The method of claim 12, where a number N represents a total of data lines in the first plurality of data lines that connect to a first ingress device in the set of ingress devices, a number S represents a total of routers in the first ingress device that are used, and wherein establishing a configuration for the switch element includes selecting the number N and the number N is an integer equal to or rounded up from a ratio of N/S.

14. The method of claim 11, wherein a number M represents a size of each router in the set of ingress devices, a number K represents a total of center stage devices in the set of center stage devices, and wherein establishing a switching configuration includes selecting the number M to be equal to the number K.

15. The method of claim 1, wherein each egress device in the set of egress devices includes a plurality of routers, the plurality of routers for at least the first egress device connecting the first egress device to all of the center stage devices in the set of center stage devices, and wherein establishing a switching configuration includes configuring each router of at least the first egress device to forward communications to only one of the second plurality of data lines.

16. A method for switching data lines across a switch element, the switch element being for connecting a first plurality of data lines to a second plurality of data lines, the switch element including a set of ingress devices connected to the first plurality of data lines, a set of egress devices connected to the second plurality of data lines, and a set of center stage devices, the method comprising:
   configuring a switch element to connect multiple ingress devices in the set of ingress devices to multiple egress devices in the set of egress devices across a first center stage device in the set of center stage devices;
   logically modeling the switch element and mapping a multi-stage logical model that represents the components of the switch element in multiple stages, comprising an input sorter, an input routers a center stage device, an output router, and an output sorter, to the switch element;
   detecting a switching event; and
   in response to the switching event, and using the logical model, performing at least one of the steps of (i) selecting from the first center stage device to connect a new ingress device to one of the multiple egress device connected to the first center stage device; (ii) selecting from the first center stage device to connect a new egress device to one of the multiple ingress devices connected to the first center stage device; and (iii) bridging from the first center stage device to connect a new egress device to one of the multiple ingress devices in the set of ingress devices.

17. The method of claim 16, wherein selecting from the first center stage device to connect a new ingress device to one of the multiple egress devices includes replacing one of the multiple ingress devices with the new ingress device.

18. The method of claim 16, wherein bridging from the first center stage device to connect a new egress device to one of the multiple ingress devices includes replacing one of the multiple egress devices with the new egress device.

19. The method of claim 16, wherein selecting from the first center stage device to connect a new egress device to one of the multiple ingress devices includes replacing one of the multiple egress devices with the new egress device.

20. The method of claim 16, wherein,
   each ingress device in the set of ingress devices includes a plurality of routers, the plurality of routers for one of the set of ingress devices connecting that ingress device to all of the center stage devices in the set of center stage devices, and
   configuring a switch element includes configuring each router of at least one of the set of ingress devices to receive communications from only one of the data lines in the first plurality of data lines.

21. The method of claim 20, wherein configuring a switch element includes assigning each data line in the first plurality of data lines to two or more router of one of the ingress devices in the set of ingress devices.

22. The method of claim 20, wherein,
   a number N represents a total of data lines in the first plurality of data lines, each of the first plurality of data lines connecting to one of the routers of each ingress device in the set of ingress devices,
   a number S represents a total of routers in each ingress device, and
   configuring the switch element includes selecting the number N and the number S so that N is equal to an integer that is equal to or rounded up from a ration of N/S.

23. The method of claim 20, wherein a number M represents a size of each router in the set of ingress devices, a number K represents a total of center stage devices in the set of center stage devices, and wherein configuring a switch element includes selecting the number N to be equal to the number K.

24. The method of claim 16, wherein,
   each egress device in the set of egress devices includes a plurality of routers, the plurality of routers for one of the set of egress devices connecting that egress device to all of the center stage devices in the set of center stage devices, and
   configuring a switch element includes configuring each router of at least one of the set of egress devices to forward communications to only one of the data lines in the second plurality of data lines.

25. The method of claim 24, wherein,
   a number N represents a total of data lines in the second plurality of data lines, each of the first plurality of data lines connecting to one of the routers of each egress device in the set of ingress devices,
   a number S represents a total of routers in the each egress device, and
   establishing a switching configuration includes selecting the number N and the number S so that N is an integer that is equal to or rounded up from a ration of N/S.

26. The method of claim 24, wherein a number M represents a size of each router in the set of egress devices, a number K represents a total of center stage devices in the set of center stage devices, and wherein configuring a switching element includes selecting the number M to be equal to the number K.

27. The method of claim 16, wherein configuring a switch element includes:
   loading configuration information into an active bank from a stand-bye bank;
   using configuration information in the active bank to determine the configuration for the switch element; and
   wherein performing steps (i), (ii) and (iii) include accessing the active bank, without first reloading configuration information into the active bank from the stand-bye bank.

28. The method of claim 27, further comprising executing an algorithm to determine the configuration before loading the configuration information into the active bank from the stand-bye bank.

29. A switch element for connecting data lines, the switch comprising:
   a set of edge devices coupled to a plurality of data lines, each edge device in the set of edge devices comprising one or more routers, each of the one or more routers being assigned only one data line in the plurality of data lines;
   a set of center stage devices, each center stage device being connectable to one of the routers of each edge device, each center stage device being configurable to connect at least two corresponding edge devices in the set of edge devices so that each center stage device forwards communications exchanged between a data line connected to one of the set of edge devices to a data line connected to another one of the set of edge devices;

wherein each of the center stage devices are actuatable to (i) bridge communications from the data line of one edge device to a new edge device connected to a new data line; and (ii) select communications from a new edge device connected to a new data line to forward the communications to one of the edge devices already connected to the center stage device; and wherein the set of edge devices are modeled, in a multi-stage logical model that represents the components of the switch element in multiple stages, comprising an input sorter, an input router a center stage device, an output router, and an output sorter.

30. The switch of claim 29, where the set of center stage devices includes a first center stage device that is connectable to one of the routers of each edge device, including to one of the routers of a first ingress device in a set of ingress devices, and to one of the routers of an egress device in the set of egress devices, so that the first center stage device forwards communications exchanged between a data line of the first ingress device and a data line of the first egress device; and wherein the first center stage device is actuatable to bridge communications from at least one of the first ingress device to a second egress device.

31. The switch element of claim 30, wherein the first center stage device is actuatable to bridge communications from at least one of the first ingress device to a second egress device while maintaining the first center stage device in connection with the first ingress device.

32. The switch element of claim 30, wherein the set of edge devices includes a set of ingress devices and a set of egress devices, so that the first center stage device forwards communications signaled from a first ingress device in the set of ingress devices to a first egress device in the set of egress devices, and wherein the first center stage device is actuatable to bridge communications from the first ingress device to a second egress device in the set of egress devices so that communications from a data line of the first ingress device is signaled to the center stage device and to the second egress device, thereby coupling a data line of the second egress device to the data line of the first egress device.

33. The switch element of claim 32, wherein the first ingress device comprises an ingress sorter that interconnects a first portion of the plurality of data lines to the plurality of routers for the first ingress device, and wherein the first ingress sorter is partitioned so that each router can receive communications from only one data line in the first portion of the plurality of data lines.

34. The switch element of claim 33, wherein each egress device in the set of egress devices includes an egress sorter that interconnects a second portion of the plurality of data lines to the plurality of routers for that egress device, and wherein the first egress sorter is partitioned so that each of the plurality of routers can forward communications to only one data line in the second portion of the plurality of data lines.

35. The switch element of claim 34, wherein the routers of the ingress devices and the egress devices are configured to include fully non-blocking, port-to-port communication capabilities.

36. The switch element of claim 32, wherein the first center stage device is actuatable to bridge communications from the first ingress device to the second egress device if a working line connected to the first egress device fails.

37. The switch element of claim 36, wherein the second egress device is connect to a protect line for the working line of the first egress device.

38. The switch of claim 33, wherein a number N represents a total of data lines in the first portion of the plurality of data lines, a number S represents a total of routers in the first ingress device, and N is an integer that is equal to or rounded up from a ratio of N/S.

39. The switch of claim 33, wherein a number M represents a size of each router in a first ingress device in the set of ingress devices, a number K represents a total of center stage devices in the set of center stage devices, and the number M is equal to the number K.

* * * * *